(12) United States Patent
Falk et al.

(10) Patent No.: US 9,191,379 B2
(45) Date of Patent: Nov. 17, 2015

(54) METHOD AND APPARATUS FOR AUTHENTICATING MULTICAST MESSAGES

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 118 days.

(21) Appl. No.: 13/823,560

(22) PCT Filed: Aug. 17, 2011

(86) PCT No.: PCT/EP2011/064130
§ 371 (c)(1),
(2), (4) Date: Mar. 14, 2013

(87) PCT Pub. No.: WO2012/034807
PCT Pub. Date: Mar. 22, 2012

(65) Prior Publication Data
US 2013/0179687 A1 Jul. 11, 2013

(30) Foreign Application Priority Data
Sep. 14, 2010 (DE) .......................... 10 2010 040 688

(51) Int. Cl.
*H04L 29/06* (2006.01)
*G06F 21/44* (2013.01)
(Continued)

(52) U.S. Cl.
CPC .............. *H04L 63/061* (2013.01); *G06F 21/44* (2013.01); *H04L 9/3242* (2013.01); *H04L 9/3247* (2013.01); *H04L 12/18* (2013.01); *H04L 63/06* (2013.01); *H04L 2209/38* (2013.01)

(58) Field of Classification Search
CPC ............................. H04L 63/061; G06F 21/44
USPC ................... 726/2, 4; 713/162–163, 168, 170
See application file for complete search history.

(56) References Cited

U.S. PATENT DOCUMENTS 6,223,286 B1 * 4/2001 Hashimoto .................... 713/178
6,259,790 B1 * 7/2001 Takagi et al. ................... 380/30
(Continued)

FOREIGN PATENT DOCUMENTS

CN 101115957 1/2008
CN 101326758 12/2008
(Continued)

OTHER PUBLICATIONS

International Search Report for PCT/EP2011/064130; mailed Apr. 8, 2012.
(Continued)

*Primary Examiner* — Hadi Armouche
*Assistant Examiner* — Sher A Khan
(74) *Attorney, Agent, or Firm* — Staas & Halsey LLP

(57) ABSTRACT

The last link in an initialization hash chain, calculated by a transmitter based on its anchor value, is distributed as an initialization function value to a receiver in an initialization phase. Subsequently, a multicast message is received and stored by a receiver and an authentication key release message, containing a cryptographic authentication key, is received from the transmitter by the receiver. A cryptographic function value h, calculated by the receiver for the cryptographic authentication key using a prescribed cryptographic function, is compared with the initialization function value to check the validity of the cryptographic authentication key in the authentication key release message. The multicast message is authenticated by the receiver using the cryptographic authentication key which has been recognized as valid.

19 Claims, 4 Drawing Sheets

(51) Int. Cl.
*H04L 9/32* (2006.01)
*H04L 12/18* (2006.01)

(56) References Cited

U.S. PATENT DOCUMENTS

| | | | |
|---|---|---|---|
| 6,643,773 B1* | 11/2003 | Hardjono | 713/153 |
| 8,230,010 B1* | 7/2012 | Hardjono et al. | 709/204 |
| 8,356,316 B2* | 1/2013 | Velazquez et al. | 725/33 |
| 2002/0044662 A1* | 4/2002 | Sowler | 380/277 |
| 2007/0260879 A1* | 11/2007 | Dzung | 713/163 |
| 2008/0276092 A1 | 11/2008 | Eberhardt et al. | |
| 2009/0098822 A1* | 4/2009 | Dugoujon et al. | 455/3.05 |
| 2009/0138712 A1* | 5/2009 | Driscoll | 713/170 |
| 2009/0161874 A1 | 6/2009 | Eun et al. | |
| 2009/0201928 A1* | 8/2009 | Chen et al. | 370/390 |
| 2010/0150048 A1 | 6/2010 | Tsai et al. | |
| 2010/0315985 A1* | 12/2010 | Moon et al. | 370/312 |
| 2011/0042368 A1 | 2/2011 | Alves | |
| 2011/0158410 A1 | 6/2011 | Falk et al. | |

FOREIGN PATENT DOCUMENTS

| | | | |
|---|---|---|---|
| DE | 102004024002 A1 | 12/2005 | |
| DE | 102008046563 A1 | 3/2010 | |
| DE | 102010040688.0 | 3/2012 | |
| WO | WO 2009053488 A1 * | 4/2009 | H02H 7/26 |

OTHER PUBLICATIONS

German Office Action for 102010040688.0; mailed Jul. 19, 2011.
Y. Challal, et al.; "A Taxonomy of Multicast Data Origin Authentication: Issues and Solutions", IEEE Communications Surveys & Tutorials, Third Quarter 2004; vol. 6, No. 3, pp. 34-57.
André Weimerskirch, "Authentication in Ad-hoc and Sensor Networks", Dissertation, Ruhr University Bochum, Germany, Jul. 2004; pp. 1-150.
"Feldgerät"; printed on Jul. 25, 2011 from de.wikipedia.org/w/index.php?title=Feldger%C3%A4t&oldid=78256483; pp. 1-2.
Office Action issued Dec. 9, 2014 in corresponding Chinese Patent Application No. 201180044259.0.

* cited by examiner

MC - N

METHOD AND APPARATUS FOR AUTHENTICATING MULTICAST MESSAGES

CROSS REFERENCE TO RELATED APPLICATIONS

This application is the U.S. national stage of International Application No. PCT/EP2011/064130, filed Aug. 17, 2011 and claims the benefit thereof. The International Application claims the benefit of German Application No. 102010040688.0 filed on Sep. 14, 2010, both applications are incorporated by reference herein in their entirety.

BACKGROUND

Described below are a method and an apparatus for authentication of multicast messages, especially of multicast messages which are exchanged between field devices of a peer-to-peer system and contain as payload data a GOOSE (Generic Object Oriented Substation Events) message or an SMV (Sampled Measured Values) message.

A field device, after detecting an event, transmits multicast messages to other registered field devices, which receive the multicast messages. These multicast messages are transmitted to the other field devices via a wireless or wired communication link by the field device which has detected the event. Such a field device can for example involve a protective device, for example an intelligent breaker circuit which is located in a transformer substation of a power supply network. The different field devices can exchange messages with one another for electrical protection and for transmission of measurement data. Furthermore the field devices can monitor and control different types of function. After detection of an event messages are not sent by a field device to a specific destination address but are sent as a broadcast or multicast message to different receiving field devices, which receive the multicast message and decide whether for their part they must process the received message. The multicast message is transmitted as a data packet which contains header data and payload data. The payload data contained in the multicast message can be formed by a GOOSE or an SMV message. Standard IEC61850 defines messages for substation controllers within an energy supply network. To protect the transmitted multicast message in this case the use of digital signatures is proposed in accordance with Standard IEC61850. For each message, to protect the message against manipulation or to protect its integrity on the transmitting field device side, a digital signature is computed and is identified by all receiving field devices.

However the significant disadvantage of this method of operation is that a considerable computing effort is required to create the digital signatures and for their verification by all receiving computing devices and the corresponding computing devices must have corresponding resources available to them to perform such calculations. In addition the verification of received multicast messages must occur within a predetermined response time, which can amount to just a few milliseconds.

SUMMARY

Described below are a method and an apparatus for authenticating a multicast message which is especially efficient and involves little calculation effort. A method for authenticating a multicast message includes the following: calculation of an initialization hash value string by a transmitter, based on an anchor value of the transmitter, and distribution as an initialization function value of the last string element of the initialization hash value string to at least one receiver in an initialization phase; receipt of a multicast message by a receiver, which stores the received multicast message; receipt of an authentication key release message by the receiver, wherein the authentication key release message contains a cryptographic authentication key released by the transmitter for the authentication of the stored multicast message; calculation by the receiver by a predetermined cryptographic function of a cryptographic function value for the cryptographic authentication key stored in the authentication key release message; comparison by the receiver of the cryptographic function value of the authentication key with the initialization function value distributed in advance in the initialization phase by the transmitter to receivers for the purpose of checking the validity of the cryptographic authentication key contained in the authentication key release message; and authentication of the multicast message stored in the receiver originating from the transmitter on the basis of the cryptographic authentication key which has been recognized as valid by the receiver.

The authentication method offers the advantage of handling key administration without a central node or a central field device. The method thus also functions without a group controller for a group of field devices.

In an embodiment of the method, the transmitter signs the initialization function value in the initialization phase with a private cryptographic key and distributes the signed key to the receivers, which verify the signature of the received initialization function value in each case by a public key.

The initialization function value may be stored or buffered by the receiver, after successful verification of the signature, for subsequent checking of the validity of the cryptographic key contained in the authentication key release message. The initialization function value can be stored temporarily.

In an embodiment of the method, the initialization function value distributed in the initialization phase is formed by a hash function value which is calculated with a predetermined hash function.

The hash function value distributed by the transmitter in the initialization phase forms a reference hash value, which forms the last element of a message protection hash value chain calculated by the transmitter, which is calculated by the transmitter in the initialization phase by the predetermined hash function, based on the anchor value of the transmitter.

In a possible embodiment of the method, the transmitter, after transmitting the multicast message, transmits within a predetermined configurable period of time an associated authentication key release message, which contains the authentication key provided for the authentication of the multicast message.

In a possible embodiment of the method, the multicast message received and stored by the receiver contains header data, payload data and a message authentication code.

In a possible embodiment of the method the payload data of the multicast message is formed by at least one GOOSE (Generic Object Oriented Substation Events) message.

In a possible further embodiment of the method the payload data of the multicast message is formed by at least one SMV (Sampled Measured Values) message.

In a possible embodiment of the method the message authentication code contained in the multicast message is calculated by the transmitter by a Hashed Message Authentication Code (HMAC) function or by a CBC-MAC function depending on the payload data of the multicast message and the cryptographic authentication key.

In a possible embodiment of the method the receiver authenticates the received and stored multicast message if the message authentication code contained in the received multicast message matches the message authentication code which is calculated by the receiver by an HMAC function or by a CBC-MAC function depending on the payload data of the multicast message and the cryptographic authentication key which has been recognized as valid, which is contained in the authentication key release message.

In a possible embodiment of the method the cryptographic authentication key contained in the authentication key release message is a hash value, which is formed by the chain element of the message protection hash chain preceding the hash value contained in the last preceding authentication key release message in the calculated message protection hash chain until such time as the anchor value of the message protection hash chain is reached.

In a possible embodiment of the method the initialization hash chain calculated in the initialization phase by the transmitter on the basis the anchor value of the transmitter is calculated by a hash function of which the chain elements are provided for initialization of further hash chains, especially of the message protection hash chain.

In an embodiment of the method there is provision for different multicast message types, wherein the transmitter, for each multicast message type, respectively calculates an associated message type hash chain based on an anchor value by a predetermined hash function for the respective multicast message type.

In an embodiment of the method the different message type hash chains are each calculated on the basis of an anchor value provided by the initialization hash chain, wherein the anchor value is formed by a chain element of the initialization hash chain.

The method can be implemented using a field device with an interface for receiving at least one multicast message and an associated authentication key release message received after a time delay, which originates from another field device, a data memory for storing the received multicast messages and a cryptographic authentication key stored in the associated authentication key release message in each case, which is intended for the authentication of the respective multicast message, and for storing an initialization function value distributed to the field device in an initialization phase, and with an authentication unit for calculating a cryptographic function value for the respective cryptographic authentication key by a predetermined cryptographic function, wherein the calculated function value is compared with the stored initialization function value for the purposes of checking the validity of the cryptographic authentication key and the stored multicast message is authenticated on the basis of the cryptographic authentication key which has been recognized as valid.

In a further possible embodiment of the field device the field device also has a calculation unit which calculates an initialization function value by a cryptographic function, wherein the initialization function value is distributed to other field devices in an initialization phase signed with a private key of the field device.

In a possible embodiment of the field device the field device transmits at least one multicast message and, after a time delay, an associated authentication key release message via the interface to other field devices, wherein the authentication key release message contains an authentication key released by the field device for the authentication of the multicast message.

In a possible embodiment of the field device the transmitted multicast message features header data, payload data and a message authentication code.

In a possible embodiment of the field device the message authentication code is calculated, depending on the payload data of the multicast message and the cryptographic authentication key, by the calculation unit.

In a possible embodiment of the field device the payload data of the multicast message is formed by at least one GOOSE (Generic Object Oriented Substation Events) message.

In an alternative embodiment of the field device the payload data of the multicast message is formed by at least one SMV (Sampled Measured Values) message.

The invention further creates a peer-to-peer system with a number of field devices which each have an interface for receiving at least one multicast message and an associated authentication key release message received after a time delay which originates from another field device, a data memory for storing received multicast messages, for storing a cryptographic authentication key contained in each case in the associated authentication key release message, which is provided for the purposes of authenticating the respective multicast message, and for storing an initialization function value distributed in an initialization phase to the respective field device, as well as having an authentication unit which is provided for calculating a cryptographic function value for the respective cryptographic authentication key by a predetermined cryptographic function, wherein the calculated function value is compared with the stored initialization function value for checking the validity of the cryptographic authentication key and the stored multicast message is authenticated on the basis of the cryptographic authentication key which has been recognized as valid.

In an embodiment of the peer-to-peer system, the timing of the field devices with one another is synchronized.

In a possible embodiment of the peer-to-peer system, the field devices each have a unit for receiving an NTP (Network Time Protocol) synchronization message or a Multimedia Messaging Service (MMS) message.

In a possible embodiment of the peer-to-peer system, the multicast messages exchanged in the system include different multicast message types which possess different priorities, wherein the configurable period of time between the transmission of a multicast message and of the associated authentication key release message is all the shorter, the higher the priority of the respective multicast message type of the multicast message is.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
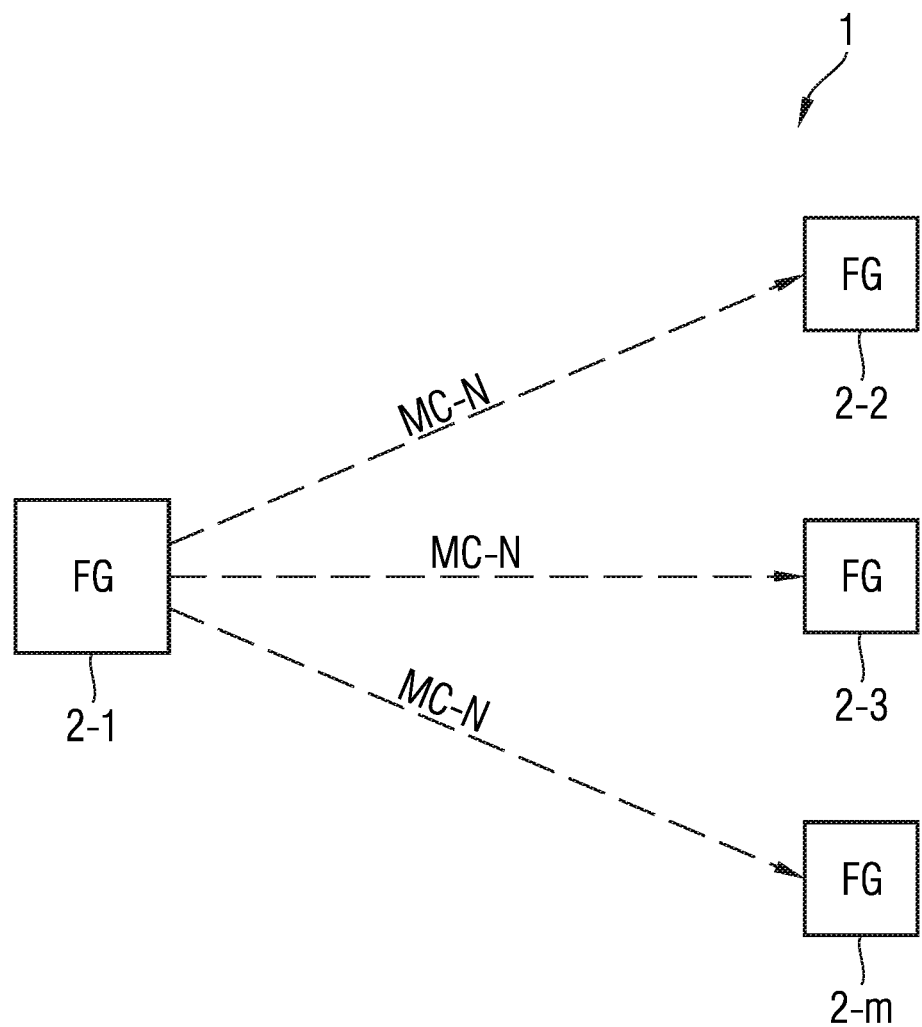
FIG. 1 is a schematic block diagram of a peer-to-peer system, having a number of field devices which authenticate multicast messages in accordance with the authentication method described below.

Reference will now be made in detail to the preferred embodiments, examples of which are illustrated in the accompanying drawings, wherein like reference numerals refer to like elements throughout.

As can be seen from FIG. 1, the authentication method can be used for authenticating multicast messages, in a peer-to-peer system 1 for example, having a number of field devices 2-1, 2-2, 2-3 . . . 2-*m*. The field devices 2-*i* can communicate with one another via wireless or also wired communication links, by exchanging messages with one another. These field devices 2-*i* can involve permanently-installed field devices but also mobile field devices. These field devices 2-*i* can transmit messages as a transmitter and receive messages as a receiver. If an event is detected by a field device, for example the field device 2-1 shown in FIG. 1, the field device 2-1 as a transmitter can transmit a multicast message MC-N to the other field devices of the peer-to-peer system 1, as shown in FIG. 1. The field devices 2-*i* can for example involve measurement devices, monitoring devices or other control devices.

Figure 2:
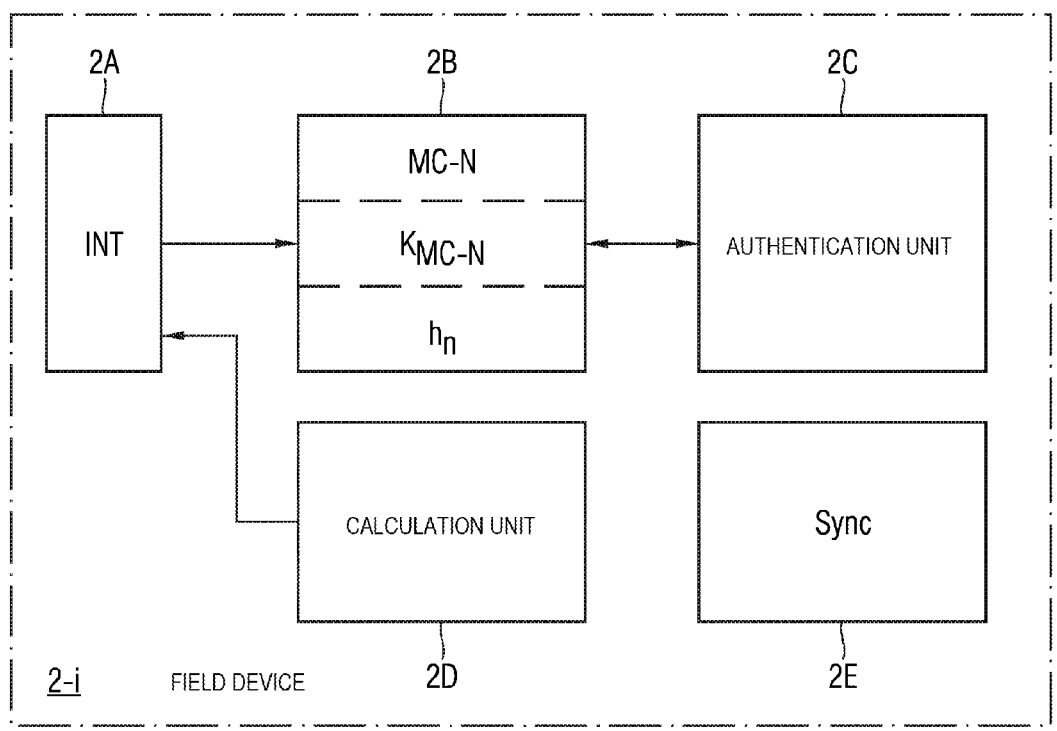
FIG. 2 is a block diagram of an exemplary embodiment of a field device.

FIG. 2 shows a block diagram of a possible exemplary embodiment of a field device 2-*i* used in a system 1 shown in FIG. 1. As shown in FIG. 2, the field device 2 has at least one interface 2*a* for sending and receiving messages. The interface 2*a* can involve a wireless interface for sending and receiving radio signals. As an alternative the interface 2*a* can also involve a wired interface for connection to a network. The interface 2*a* is suitable for receiving at least one multicast message MC-N. Furthermore an associated authentication key release message KRM, received after a time delay, which originates from another field device of the system, can be sent via the interface 2*a* in the exemplary embodiment shown in FIG. 2.

The field device 2 contains, as shown in FIG. 2, a local data memory 2*b*. At least one received multicast message MC-N can be stored or buffered in the data memory 2*b*. Furthermore a cryptographic authentication key K of a multicast message contained in an associated received authentication key release message or (KRM) can be stored in the data memory 2*b*. The stored cryptographic authentication key K in this case is intended for the authentication of the respective multicast message MC-N. Furthermore an initialization function value hn distributed to the field device 2 in an initialization phase IP can be stored in the data memory 2*b* of the field device.

The data memory 2*b* is linked to an authentication unit 2*c* of the field device 2. The authentication unit calculates the cryptographic function value h(K) for the respective cryptographic authentication key K, which is stored in the data memory 2*b*, by means of the predetermined cryptographic function H. The cryptographic function H can for example involve a hash function. The calculated function value h(K) is compared with the initialization function value hn stored in the data memory 2*b* for checking the validity of the cryptographic authentication key K. If the cryptographic authentication key K is recognized as valid, the associated stored multicast message MC-N is subsequently authenticated by the authentication unit 2*c* of the field device 2 on the basis of the cryptographic authentication key K recognized as valid.

As shown in FIG. 2, the field device 2 can additionally have a calculation unit 2*d*, which calculates an initialization function value by the cryptographic function H, wherein the calculated initialization function value is distributed to other field devices signed with a private key Kpriv of the field device 2 in an initialization phase IP of the system 1. This private key Kpriv can be stored configurability in a further access-protected data memory of the field device 2. After transmission of a multicast message MC-N by the field device 2 shown in FIG. 2 via the interface 2*a* to other field devices of the system 1, the field device 2 transmits via the interface 2*a* an associated time-delayed authentication key release message KRM to the other field devices. This authentication key release message in this case contains at least one authentication key K released by the field device 2 for the authentication of the multicast message MC-N. The time delay between the transmitted multicast message MC-N and the subsequently transmitted associated authentication key release message KRM is able to be configured in a possible embodiment and can depend on a priority of the respective multicast message or on the multicast message type.

In a possible embodiment the multicast message MC-N is automatically generated and transmitted by a calculation unit of the field device 2 after detection of a specific event. For detection of an event the field device 2 depicted in FIG. 2 can additionally have sensors. In a further possible embodiment an event is detected on the basis of a message received in another node or field device. The multicast message MC-N transmitted by a field device 2 on detection of an event contains header data, payload data and a message authentication code MAC. In this case the authentication code is calculated as a function of the payload data of the multicast message MC-N and the cryptographic authentication key K by the calculation unit 2*d* of the field device 2. The transmitted multicast message MC-N thus involves a data packet in a specific data format.

Figure 5:
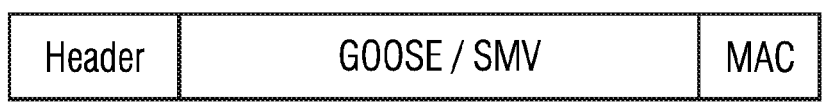
FIG. 5 is a data format diagram of a multicast message able to be authenticated by the method described below.

FIG. 5 shows a possible example for a data format of a multicast message MC-N transmitted by the field device 2. The multicast message, as shown in FIG. 5, has header data and also payload data. The multicast message MC-N further contains the generated message authentication code MAC, which is calculated as a function of the payload data of the multicast message and the cryptographic authentication key K by the calculation unit 2*d* of the field device 2. In a possible embodiment the payload data contained in the multicast message is for its part a message, especially a GOOSE (Generic Object Oriented Substation Events) message or an SMV (Sampled Measured Values) message.

In a possible embodiment of the field device 2 the field device 2, as shown in FIG. 2, also has a synchronization unit 2*e*, with which the field device 2 is synchronized with other field devices of the system 1. In a possible embodiment the field device has a unit for receiving an NTP (Network Time Protocol) synchronization message. In an alternate embodiment the field device 2 has a unit for receiving an MMS message. In a further alternative embodiment the field device 2 has a unit for receiving an IEEE 1588 synchronization message.

Figure 3:
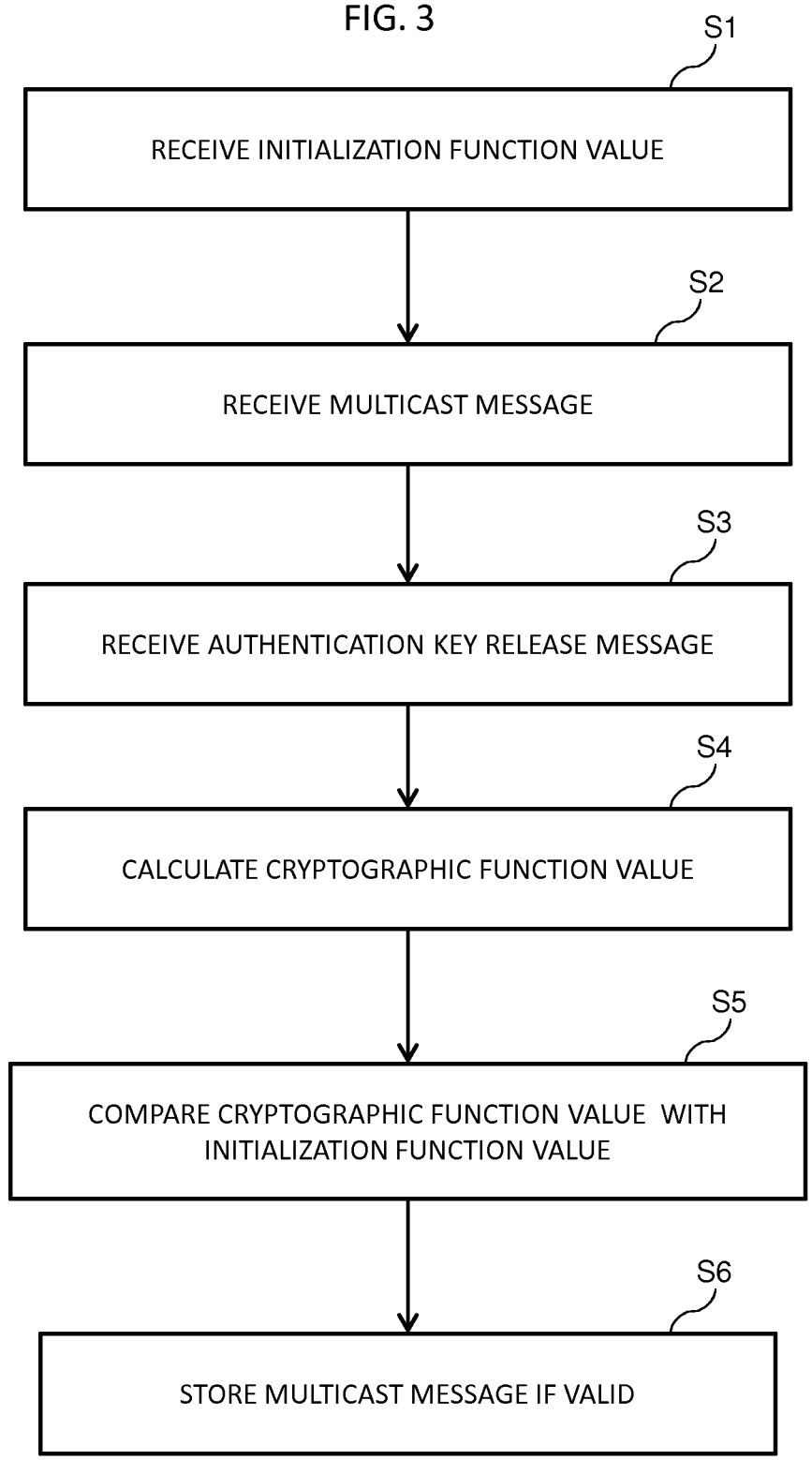
FIG. 3 is a flow diagram of an exemplary embodiment of a method for authenticating a multicast message.

FIG. 3 is a flow diagram for presenting an exemplary embodiment of the method for authenticating an authentication message MC-N.

In the system 1, as shown in FIG. 1 in an initialization phase A1 an initialization chain is first of all calculated based on a predetermined anchor value of the respective field device. Subsequently the last chain element of the calculated initialization hash chain is distributed as an initialization function value to at least one receiver or to the other field devices. When this is done, the transmitter or the transmitting field device respectively signs an initialization function value hn with a private cryptographic key Kpriv in an initialization phase IP and distributes the signed initialization function value hn, which forms the last chain element of the initialization hash chain, to the other field devices. On successful verification of an initialization function value by the other field devices the distributed initialization function value hn is stored in the other respective available data memory present 2*b*. The initialization function value is thus stored after successful verification of the signature for subsequent checking of the validity of the cryptographic key K contained in an authentication key release message KRM in its data memory 2b in each case by the other field devices. In an embodiment, the initialization function value hn distributed in the initialization phase IP is formed by a hash function value, which is calculated with a predetermined hash function. The hash function value hn distributed by the transmitting field device in the initialization phase IP forms a reference hash value, which forms the last element message protection hash chain calculated by the transmitting field device. This message protection hash chain is calculated by the transmitting field device or transmitter in the initialization phase IP by the predetermined hash function H based on the anchor value of the transmitter. Each field device 2-i of the system 1 may have its own anchor value.

After a field device 2-i, in S1, has received an initialization function value from another field device in the initialization phase IP and after successful verification, has stored this value in its local data memory 2b, the field device 2, in S2 the field device 2-i receives a multicast message MC-N, which originates from another field device, and likewise stores this received multicast message MC-N in its local data memory 2b.

The field device from which the multicast message MC-N was transmitted, transmits within a predetermined configurable period of time Δt an associated authentication key release message or key release management message, which contains the authentication key K provided for authentication of the multicast message MC-N. The authentication key release message KRM is received by the receiving field device 2 in S3. The received authentication key release message KRM contains the cryptographic authentication key K released by the transmitting field device of the multicast message MC-N already stored for the authentication in the data memory 2.

In S4 a cryptographic function value h(K) is calculated by the authentication unit 2c of the receiving field device for the cryptographic authentication key K contained in the received authentication key release message KRM by a predetermined cryptographic function H. In a possible embodiment the authentication unit 2c is preconfigured via a configuration interface with a corresponding function.

In S5 the cryptographic function value h(K) of the authentication key K calculated by the authentication unit 2c of the field device 2 is compared with the initialization function value hn distributed beforehand in the initialization phase IP by the transmitting field device 2 for checking the validity of the cryptographic authentication key K stored in the authentication key release message KRM.

If the cryptographic authentication key K is recognized as valid by the receiving field device, in S6, the multicast message MC-N stored in the receiving field device originating from the transmitting field device is authenticated. This authenticated multicast message MC-N is then further processed or evaluated.

In a possible embodiment the message authentication code MAC contained in the multicast message MC-N is calculated by the transmitting field device by an HMAC function, depending on the payload data of the multicast message MC-N, with the cryptographic authentication key K. In a possible embodiment an Integrity Check Value ICV is calculated with the HMAC function. In a possible embodiment the HMAC function has the following form:

$$HMAC(H,N)=H((K\ XOR\ opad)\|H((K\ XOR\ ipad)\|N));$$

wherein N is the message which is contained as payload data in the multicast message MC-N.

In this variant the receiving field device stores the received messages for verifying their authenticity.

In a further variant the message authentication code MAC is calculated as follows:

$$MAC(K,N)=H(K\|H(N)).$$

This variant allows the pre-calculation of the hash values of the message H(N).

In this embodiment it is only necessary to buffer the hash value and not the entire message N for verification of its authenticity.

The receiving field device authenticates the received and stored multicast message MC-N, if the message authentication code MAC contained in the multicast message MC-N matches the message authentication code MAC' which is calculated by the receiver by the function, especially by an HMAC function or a CBC-MAC function, depending on the payload data of the multicast message and the cryptographic authentication key K recognized as valid, which is contained in the authentication key release message KRM.

The cryptographic authentication key K contained in the authentication key release message KRM in this case forms a hash value, which is formed by the chain element hn−1 of the message protection hash chain preceding the hash value hn contained in the last preceding authentication key release message in the calculated message protection hash chain until such time as the anchor value of the message protection hash chain is reached.

In the initialization phase IP the initialization hash chain is calculated by the transmitting field device or transmitter based on the anchor value of the transmitting field device, by a hash function H, the hash elements hi of which are provided in a possible embodiment for initialization of further hash chains, especially the message protection hash chain.

In a possible embodiment of the method, different multicast message types are provided. In this case a transmitting field device calculates for each multicast message type, based on an anchor value in each case, an associated hash chain by a predetermined hash function for the respective multicast message type. The different message type hash chains are each calculated, based on an anchor value provided by the initialization hash chain, wherein the anchor value is formed in each case by a chain element of the initialization hash chain. The multicast messages MC-N exchanged in the system 1 can include different multicast message types MC-N-TYP having different priorities. In a possible embodiment the configurable period of time Δt between the transmission of a multicast message MC-N and the associated authentication key release message KRM is all the shorter, the higher the priority of the respective multicast message type of the multicast message is. For example in a possible embodiment different priorities are defined for fast messages, medium speed messages and for low speed messages. Fast or critical messages in this case are the messages to be transmitted with a high priority, i.e. with such messages the period of time between the transmission of the corresponding multicast message MC-N and the associated authentication key release message KRM is low and can amount for example to less than 5 milliseconds.

Figure 4:
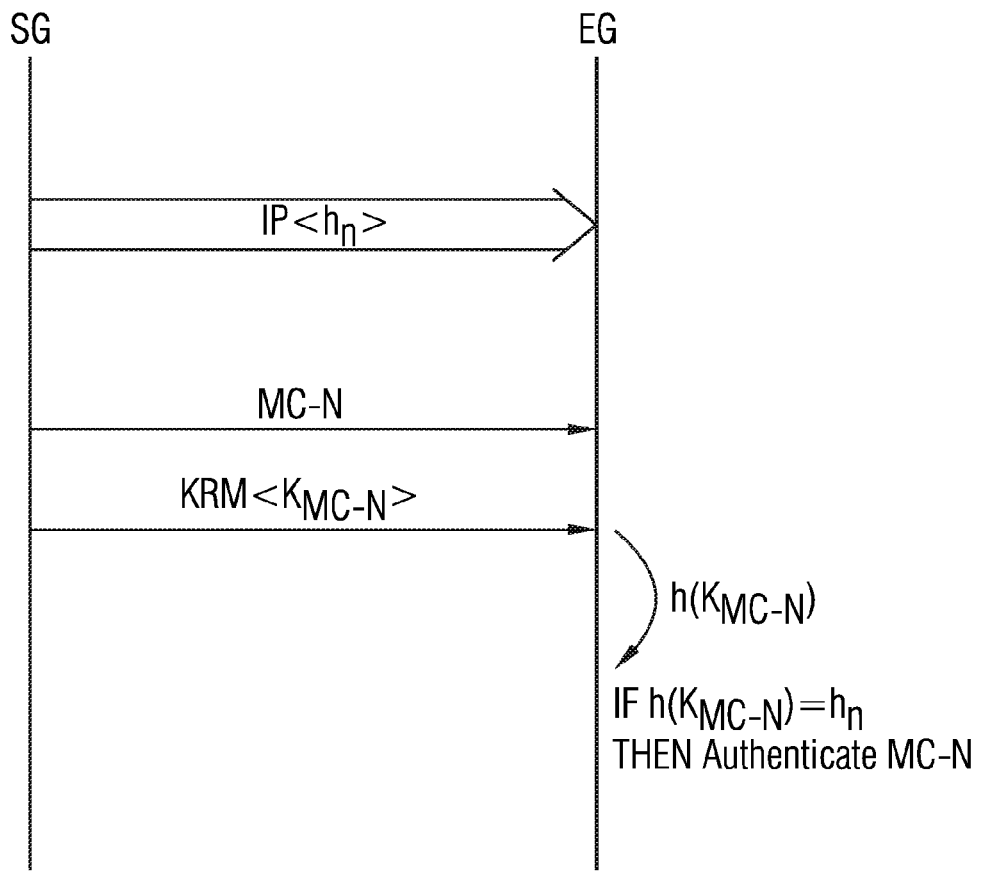
FIG. 4 is a signal diagram to explain the inventive authentication method.

FIG. 4 once again serves to illustrate the method. In an initialization phase IP an initialization hash chain is calculated by a transmitting field device or transmitter SG based on an anchor value of the transmitting apparatus SG and subsequently the last chain element of the initialization hash chain is distributed as an initialization function value hn to at least one receiver EG. In an operating phase of the system the field device SG, for example on detection of an event, transmits a multicast message MC-N to the other receiving field devices EG. After a specific configurable time delay Δt the transmitter SG further sends an authentication key release message KRM to the other field devices, wherein the authentication key release message KRM contains a cryptographic authentication key K released for the authentication of the previously transmitted multicast message MC-N by the transmitter SG. The cryptographic function value h(k) for the cryptographic authentication key K contained in the authentication key release message KRM is calculated by a predetermined cryptographic function H by the receiver EG, as shown in FIG. 4. The cryptographic function value h(k) of the authentication key K calculated by the receiver EG is subsequently compared with the initialization function value hn for checking the validity of the cryptographic authentication key K contained in the authentication key release message KRM. If the two compared values are identical or largely identical, the multicast message MC-N originating from the transmitter SG stored in the receiver is authenticated. The authenticated message MC-N can subsequently be evaluated.

In the method. an integrity protection for broadcast or multicast of a number of messages using hash chains is achieved by the use of digital signatures. The method can be used for example with an energy control protocol for energy field devices, for example a protection station controller.

In a variant of the method. a broadcast-multicast hash chain is linked to a specific class or a specific type of message respectively. The type of a control message can be specified by the transmitting field device as part of the initialization information. This allows a receiving field device to establish whether a hash chain tends to be relevant for control commands of the receiving field device. If this is the case the receiving field device or the receiver stores the initialization information. In a possible embodiment the receiving field device or receiver verifies whether the received control message or multicast messages actually correspond to the announced type or the announced class in accordance with hash chain initialization information.

In a possible embodiment of the method, chain elements of an initialization hash chain each form anchor values for further hash chains, especially for message protection hash chains. This allows different hash chains to be provided for different message classes or message types. Furthermore in this way, hash chains can be determined which have to be provided frequently, since as a result of the high priority of the respective message type the chain elements are consumed or used up rapidly.

In a possible embodiment of the system 1, the different field devices 2 perform a local registration for different events, meaning that each field device 2 decides by itself whether the received multicast messages will be processed by the respective field device and which multicast messages MC-N will be discarded by the respective field device 2. In a possible embodiment of the system 1 different messages are combined into message groups, which can each have different priorities. The transmitting field device which transmits a multicast message MC-N, can then link a hash chain in a specific message cluster or a specific message group. This is possible for example by a cluster criterion being contained in the key information presented. Furthermore it is possible for the transmitting field devices to provide this information during the distribution of the chain anchor value.

In a possible variant a command or a command transmitted in a multicast message MC-N is only executed if it is estimated to be plausible within the context of the previously executed commands or control data and the measured data contained therein.

In a possible variant of the system 1, each field device transmits a hash chain for key material in order to provide message protection, and a second hash chain in order to provide anchor values for further hash chains. This enables the number of asymmetrical cryptographic operations to be reduced.

In a possible embodiment of the system 1, each field device 2 has a pair of keys, a public key and a private key. Here the public key is certified and available to the other field devices. As an alternative the certificates can be transferred as a part of the protocol. In a possible embodiment of the system 1 the length of a calculated hash chain depends on the time interval Δt provided between the transmission of the multicast message MC-N and the key release message KRM. The shorter this time interval Δt is, the more chain elements will be calculated for the respective hash chain.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for authenticating a multicast message from among different multicast message types, comprising:
    calculating an initialization hash chain in an initialization phase by a transmitter based on an anchor value of the transmitter using an initialization hash function and chain elements of the initialization hash chain provided for initialization of a message protection hash chain;
    calculating, by the transmitter for each multicast message type, based in each case on an anchor value formed by one of the chain elements of the initialization hash chain, an associated message type hash chain using a respective hash function for the multicast message type;
    distributing a last chain element of the initialization hash chain as an initialization function value to at least one receiver in the initialization phase;
    receiving and storing the multicast message by a receiver;
    receiving, from the transmitter by the receiver, an authentication key release message containing a cryptographic authentication key released by the transmitter for authentication of the multicast message stored by the receiver;
    calculating, by the receiver, a cryptographic function value for the cryptographic authentication key contained in the authentication key release message using a predetermined cryptographic function;
    comparing the cryptographic function value of the authentication key calculated by the receiver with the initialization function value to check validity of the cryptographic authentication key contained in the authentication key release message; and
    authenticating, by the receiver, the multicast message stored in the receiver based on the authentication key that has been recognized as valid.

2. The method as claimed in claim 1, further comprising:
    producing a signature, by the transmitter prior to said distributing in the initialization phase, of the initialization function value using a private cryptographic key;
    verifying, by the at least one receiver, the signature of the initialization function value using a public key,
    storing the initialization function value, after successful verification of the signature, by the receiver for subsequent checking of the validity of the cryptographic key contained in the authentication key release message.

3. The method as claimed in claim 2, further comprising forming the initialization function value distributed in the initialization phase based on a hash function value calculated using a first predetermined hash function.

4. The method as claimed in claim 3, wherein the initialization function value distributed by the transmitter in the initialization phase forms a reference hash function value, which forms the last element of a message protection hash chain calculated by the transmitter, which is calculated in the initialization phase using the first predetermined hash function based on the anchor value of the transmitter.

5. The method as claimed in claim 4, further comprising transmitting, by the transmitter within a predetermined configurable period of time after transmitting the multicast message, the authentication key release message containing the authentication key provided for authentication of the multicast message.

6. The method as claimed in claim 5, wherein the multicast message received and stored by the receiver includes header data, payload data and a message authentication code.

7. The method as claimed in claim 6, wherein the payload data of the multicast message is formed by one of a generic object oriented substation events message and a sample measure values message.

8. The method as claimed in claim 7, further comprising calculating the message authentication code contained in the multicast message by the transmitter using a Hashed Message Authentication Code function depending on the payload data of the multicast message and the cryptographic authentication key.

9. The method as claimed in claim 8, wherein said authenticating of the multicast message occurs if the message authentication code stored in the multicast message received from the transmitter corresponds to a receiver calculated message authentication code, which is calculated by the receiver using the Hashed Message Authentication Code function depending on the payload data of the multicast message and the cryptographic authentication key contained in the authentication key release message and recognized as valid.

10. The method as claimed in claim 9, further comprising forming the cryptographic authentication key contained in the authentication key release message as a hash value by a chain element of the message protection hash chain preceding the hash value contained in a last preceding authentication key release message until the anchor value of the message protection hash chain is reached.

11. A field device, comprising:
an interface receiving at least one multicast message from among different multicast message types and, corresponding to each multicast message, an associated authentication key release message and an associated message type hash chain received after a time delay and originating from another field device that calculated the associated message type hash chain for a respective multicast message type based on an anchor value formed by a chain element of an initialization hash chain;
a data memory storing the at least one multicast message and a cryptographic authentication key contained in the associated authentication key release message corresponding to each multicast message and provided for authentication of a corresponding multicast message, and a last chain element of the initialization hash chain as an initialization function value distributed to the field device in an initialization phase prior to receipt of the at least one multicast message; and
a hardware processor programmed to
calculate a cryptographic function value for the cryptographic authentication key corresponding to each multicast message using a predetermined cryptographic function,
compare the cryptographic function value with the initialization function value to check validity of the cryptographic authentication key and
authenticate the multicast message based on the cryptographic authentication key recognized as valid.

12. The field device as claimed in claim 11,
further comprising an arithmetic processor calculating an initialization function value using a cryptographic function, and
wherein the initialization function value, signed with a private key of the field device, is distributed in an initialization phase to other field devices.

13. The field device as claimed in claim 12, wherein the field device transmits to other field devices via said interface at least one multicast message and, after a time delay, an associated authentication key release message corresponding to each multicast message and containing an authentication key released by the field device for authentication of a corresponding multicast message.

14. The field device as claimed in claim 13, wherein the multicast message includes header data, payload data and a message authentication code calculated, by said arithmetic processor of the field device, based on the payload data and the cryptographic authentication key.

15. The field device as claimed in claim 14, wherein the payload data of the multicast message is formed by one of a generic object oriented substation events message and a sampled measured values message.

16. A peer-to-peer system, comprising:
field devices exchanging multicast messages from among different multicast message types, each field device having
an interface receiving, in an initialization phase as an initialization function value, a last chain element of an initialization hash chain calculated by another field device based on an anchor value of the other field device and subsequently receiving at least one multicast message and, corresponding to each multicast message, an associated authentication key release message and an associated message type hash chain received after a time delay and originating from the other field device that calculated the associated message type hash chain for a respective multicast message type based on an anchor value formed by a chain element of the initialization hash chain;
a data memory storing the at least one multicast message and a cryptographic authentication key contained in the associated authentication key release message corresponding to each multicast message and provided for authentication of a corresponding multicast message; and
a hardware processor programmed to
calculate a cryptographic function value for the cryptographic authentication key corresponding to each multicast message using a predetermined cryptographic function,
compare the cryptographic function value with the initialization function value to check validity of the cryptographic authentication key and
authenticate the multicast message based on the cryptographic authentication key that has been recognized as valid.

17. The peer-to-peer system as claimed in claim 16, wherein the field devices are time-synchronized with one another.

18. The peer-to-peer system as claimed in claim 17, wherein the field devices each further comprises a receiver receiving at least one of a network time protocol synchronization message and a multimedia messaging service message.

19. The peer-to-peer system as claimed in claim 18,
wherein the multicast messages exchanged in the peer-to-peer system have different multicast message types with different priorities, and
wherein a configurable period of time between transmission of each of the multicast messages and the associated authentication key release message corresponding thereto is shorter with increases in a priority of a multicast message type of the corresponding multicast message.

\* \* \* \* \*